United States Patent
Cheng et al.

(10) Patent No.: US 12,289,696 B2
(45) Date of Patent: Apr. 29, 2025

(54) USER EQUIPMENT BEHAVIOR ON OBTAINING NEW RADIO EARLY MEASUREMENT CONFIGURATION

(71) Applicant: QUALCOMM Incorporated, San Diego, CA (US)

(72) Inventors: Peng Cheng, Beijing (CN); Huichun Liu, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 466 days.

(21) Appl. No.: 17/597,794

(22) PCT Filed: Aug. 15, 2019

(86) PCT No.: PCT/CN2019/100857
§ 371 (c)(1),
(2) Date: Jan. 24, 2022

(87) PCT Pub. No.: WO2021/026908
PCT Pub. Date: Feb. 18, 2021

(65) Prior Publication Data
US 2022/0248349 A1    Aug. 4, 2022

(51) Int. Cl.
*H04W 56/00* (2009.01)
*H04W 24/10* (2009.01)
*H04W 76/30* (2018.01)

(52) U.S. Cl.
CPC ......... *H04W 56/001* (2013.01); *H04W 24/10* (2013.01); *H04W 76/30* (2018.02)

(58) Field of Classification Search
CPC ... H04W 56/001; H04W 24/10; H04W 36/08; H04W 76/30; H04W 56/0015; H04W 48/12
See application file for complete search history.

(56) References Cited

U.S. PATENT DOCUMENTS

2018/0324678 A1* 11/2018 Chen .................. H04W 8/08
2019/0098590 A1    3/2019 Nam et al.
(Continued)

FOREIGN PATENT DOCUMENTS

WO    WO-2017217719 A1    12/2017
WO    WO-2019016987 A1    1/2019

OTHER PUBLICATIONS

Huawei, 3GPP TSG-RAN WG2#106 Reno, USA, "Usage of SI and dedicated signalling for early measurement configuration", R2-1907477, (Year: 2019).*

(Continued)

*Primary Examiner* — Ayaz R Sheikh
*Assistant Examiner* — Mang Boi Thawng
(74) *Attorney, Agent, or Firm* — Norton Rose Fulbright US LLP/Qualcomm Incorporated

(57) ABSTRACT

This disclosure provides systems, methods, and apparatus, including computer programs encoded on computer storage media, for wireless communication by a user equipment (UE). In one aspect, the UE is configured to select, by a user equipment (UE), a list of synchronization signal block (SSB) frequencies included in at least one message as a selected list of SSB frequencies. The UE is further configured to determine, based on whether a first frequency included in the selected list of SSB frequencies is an overlapping carrier or a non-overlapping carrier, whether to perform a new radio (NR) early measurement operation for the first frequency. The UE is also configured to identify a SSB-based measurement timing configuration (SMTC) based on a determination to perform the NR early measurement operation for the first frequency, and to initiate the NR early measurement operation for the first frequency using the identified SMTC.

35 Claims, 6 Drawing Sheets

(56) References Cited

U.S. PATENT DOCUMENTS

| | | | |
|---|---|---|---|
| 2019/0103931 A1* | 4/2019 | Yi | H04B 7/2656 |
| 2019/0182900 A1 | 6/2019 | Cui et al. | |
| 2020/0029239 A1* | 1/2020 | Chen | H04W 76/19 |
| 2020/0252823 A1* | 8/2020 | Kim | H04W 48/16 |
| 2021/0037403 A1* | 2/2021 | Kim | H04W 56/001 |

OTHER PUBLICATIONS

Huawei, 3GPP TSG-RAN WG2 #105 Athens, Greece, Early measurement configuration/reporting in LTE and NR RRC_Inactive, R2-1901613 (Year: 2019).*

Vivo, 3GPP TSG-RAN WG2 Meeting #105 Athens, Greece, "Measurement in Idle and Inactive States", R2-1900261 (Year: 2019).*

Mediatek, 3GPP TSG-RAN WG2 Meeting #105 Athens, Greece, "Early measurement reporting from Idle/Inactive to Connected", R2-1900437 (Year: 2019).*

ZTE, 3GPP TSG-RAN WG2 Meeting#105 Athens, Greece, ,"Early measurement reporting for RRC idle and inactive state", R2-1900801 (Year: 2019).*

Huawei, 3GPP TSG-RAN WG2#106 Reno, USA, "Discussion on SMTC configuration for early measurement", R2-1907480, (Year: 2019).*

International Search Report and Written Opinion—PCT/CN2019/100857—ISA/EPO—May 22, 2020.

3GPP TS 36.133, "Foreword", 36133-F70_S00-11, 3rd Generation Partnership Project, Mobile Competence Centre, 650, Route Des Lucioles, F-06921 Sophia-Antipolis Cedex, France, Jul. 4, 2019, 3GPP TS 36.133, V15.7.0, Release 15, 322 Pages, XP051754768, Paragraph 4.9.2.

CATT: "Open Issues on Early Measurement Configurations", 3GPP TSG-RAN WG2 Meeting #106, R2-1905878, 3rd Generation Partnership Project, Mobile Competence Centre, 650, Route Des Lucioles, F-06921 Sophia-Antipolis Cedex, France, vol. RAN WG2, No. Reno, USA, May 13, 2019-May 17, 2019, May 13, 2019, 4 Pages, XP051729373, Paragraph 2.3.

ERICSSON: "Further Considerations on Early Reporting of SCell Candidates for euCA", 3GPP TSG-RAN WG4 Meeting #88, R4-1809728, 3rd Generation Partnership Project, Mobile Competence Centre, 650, Route Des Lucioles, F-06921 Sophia-Antipolis Cedex, France, vol. RAN WG4, No. Gothenburg, Sweden, Aug. 20, 2018-Aug. 24, 2018, Aug. 10, 2018, 4 Pages, XP051578768, Paragraph 1.

Qualcomm Incorporated: "Summary of Email Discussion [105#54] [NR/eCA-DC]: Measurement Configuration", 3GPP TSG-RAN WG2 Meeting#105bis, R2-1903237, 3rd Generation Partnership Project, Mobile Competence Centre, 650, Route Des Lucioles, F-06921 Sophia-Antipolis Cedex, France, vol. RAN WG2, No. Xi'an, China, Apr. 8, 2019-Apr. 12, 2019, Apr. 6, 2019, 38 Pages, XP051700587, Summary of Question 9, Observation 8.

Qualcomm Incorporated: "Summary of Email Discussion [106#36] [NR/eCA-DC]: Measurement and Reporting Configuration", 3GPP TSG-RAN WG2 Meeting#107, R2-1908673, 3rd Generation Partnership Project, Mobile Competence Centre, 650, Route Des Lucioles, F-06921 Sophia-Antipolis Cedex, France, vol. RAN WG2, No. Prague, Czech, Aug. 26, 2019-Aug. 30, 2019, Aug. 16, 2019, 40 Pages, XP051766499, Paragraph 3.3.

Supplementary European Search Report—EP19941112—Search Authority—Munich—Mar. 30, 2023.

3GPP: "Foreword", 36133-F70_S00-11, 3rd Generation Partnership Project, Mobile Competence Centre, 650, Route Des Lucioles, F-06921 Sophia-Antipolis Cedex, France, Jul. 4, 2019, 322 Pages.

Qualcomm Incorporated: "Summary of Email Discussion [105#54] [NR/eCA-DC]: Measurement Configuration", 3GPP TSG-RAN WG2 Meeting#105bis, R2-1903237, 3rd Generation Partnership Project, Mobile Competence Centre, 650, Route Des Lucioles, F-06921 Sophia-Antipolis Cedex, France, vol. RAN WG2, No. Xi'an, China, Apr. 8, 2019-Apr. 12, 2019, Apr. 6, 2019, 38 Pages.

* cited by examiner

USER EQUIPMENT BEHAVIOR ON OBTAINING NEW RADIO EARLY MEASUREMENT CONFIGURATION

CROSS-REFERENCE TO RELATED APPLICATIONS

This application claims the benefit of International Patent Application No. PCT/CN2019/100857, entitled, "USER EQUIPMENT BEHAVIOR ON OBTAINING NEW RADIO EARLY MEASUREMENT CONFIGURATION," filed on Aug. 15, 2019, which is expressly incorporated by reference herein in its entirety.

TECHNICAL FIELD

Aspects of the present disclosure relate generally to wireless communication systems, and more particularly, to obtain a new radio early measurement configuration.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

The UE may receive an early measurement configuration in either in message, such as a radio resource controller (RRC) release message. After a cell reselection, the UE may perform IDLE state euCA measurement after cell reselection. Additionally, or alternatively, after cell reselection, may update the configuration according to a message received from a target cell. In some implementations, the message from the target cell does not include a frequency configuration for the IDLE mode measurements, the UE stops performing IDLE state inter frequency measurements after cell reselection. In situations where SSB-based measurement timing configuration (SMTC) information for early measurement is included in a messages, such as an RRC release message, the timing (related to the SMTC information) may be based on timing reference of PCell. However, if the UE moves to another cells other than the original PCell, the UE is unaware of whether the other cell is synchronized with the original PCell. Accordingly, the timing reference of the UE (from the SMTC information of the RRC release message) may no longer be usable. In such situations, the UE has no way of determining whether the other cell is synchronized. Additionally, in such situations, the UE has no defined options of how to determine or obtains the timing reference for SMTC info in early measurement configuration when serving cell changes.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes selecting, by a user equipment (UE), a list of synchronization signal block (SSB) frequencies included in at least one message as a selected list of SSB frequencies. The method also includes determining, based on whether a first frequency included in the selected frequency list is an overlapping carrier or a non-overlapping carrier, whether to perform a new radio (NR) early measurement operation for the first frequency. The method further includes identifying a SSB-based measurement timing configuration (SMTC) based on a determination to perform the NR early measurement operation for the first frequency. The method includes performing the NR early measurement operation for the first frequency using the identified SMTC.

In an additional aspect of the disclosure, an apparatus configured for wireless communication includes means for selecting, by a user equipment (UE), a list of synchronization signal block (SSB) frequencies included in at least one message as a selected list of SSB frequencies. The apparatus also includes means for determining, based on whether a first frequency included in the selected frequency list is an overlapping carrier or a non-overlapping carrier, whether to perform a new radio (NR) early measurement operation for the first frequency. The apparatus also includes identifying a SSB-based measurement timing configuration (SMTC) based on a determination to perform the NR early measurement operation for the first frequency. The apparatus includes means for performing the NR early measurement operation for the first frequency using the identified SMTC.

In an additional aspect of the disclosure, a non-transitory computer-readable medium having program code recorded thereon. The program code further includes code to: select, by a user equipment (UE), a list of synchronization signal block (SSB) frequencies included in at least one message as a selected list of SSB frequencies; determine, based on whether a first frequency included in the selected frequency list is an overlapping carrier or a non-overlapping carrier, whether to perform a new radio (NR) early measurement operation for the first frequency; identify a SSB-based measurement timing configuration (SMTC) based on a determination to perform the NR early measurement operation for the first frequency; and perform the NR early measurement operation for the first frequency using the identified SMTC.

In an additional aspect of the disclosure, an apparatus configured for wireless communication is disclosed. The apparatus includes at least one processor, and a memory coupled to the processor. The processor is configured to perform operations comprising: selecting, by a user equipment (UE), a list of synchronization signal block (SSB) frequencies included in at least one message as a selected list of SSB frequencies; determining, based on whether a first frequency included in the selected frequency list is an overlapping carrier or a non-overlapping carrier, whether to perform a new radio (NR) early measurement operation for the first frequency; identifying a SSB-based measurement timing configuration (SMTC) based on a determination to perform the NR early measurement operation for the first frequency; and performing the NR early measurement operation for the first frequency using the identified SMTC.

In an additional aspect of the disclosure, an apparatus configured for wireless communication includes an interface configured to receive at least one message. The apparatus also includes a processor system configured to: select, by a user equipment (UE), a list of synchronization signal block (SSB) frequencies included in at least one message as a selected list of SSB frequencies; determine, based on whether a first frequency included in the selected frequency list is an overlapping carrier or a non-overlapping carrier, whether to perform a new radio (NR) early measurement operation for the first frequency; identify a SSB-based measurement timing configuration (SMTC) based on a determination to perform the NR early measurement operation for the first frequency; and perform the NR early measurement operation for the first frequency using the identified SMTC.

In an additional aspect of the disclosure, a method of wireless communication includes generating, by a base station, at least one message including a list of SSB frequencies. At least one frequency included in the list of frequencies comprises an overlapping carrier or a non-overlapping carrier. The method also includes transmitting, by the base station, the at least one message to a user equipment (UE). The method further includes receiving, by the base station, a report based on new radio (NR) early measurement operations performed by the UE. The NR early measurement operations performed based on a determination of whether the at least one frequency is the overlapping carrier or a non-overlapping carrier.

In an additional aspect of the disclosure, an apparatus configured for wireless communication includes means for generating, by a base station, at least one message including a list of SSB frequencies. At least one frequency included in the list of frequencies comprises an overlapping carrier or a non-overlapping carrier. The apparatus also includes means for transmitting, by the base station, the at least one message to a user equipment (UE). The apparatus further includes means for receiving, by the base station, a report based on new radio (NR) early measurement operations performed by the UE. The NR early measurement operations performed based on a determination of whether the at least one frequency is the overlapping carrier or a non-overlapping carrier.

In an additional aspect of the disclosure, a non-transitory computer-readable medium having program code recorded thereon. The program code further includes code to generate, by a base station, at least one message including a list of SSB frequencies. At least one frequency included in the list of frequencies comprises an overlapping carrier or a non-overlapping carrier. The program code further includes code to transmit, by the base station, the at least one message to a user equipment (UE). The program code further includes code to receive, by the base station, a report based on new radio (NR) early measurement operations performed by the UE. The NR early measurement operations performed based on a determination of whether the at least one frequency is the overlapping carrier or a non-overlapping carrier.

In an additional aspect of the disclosure, an apparatus configured for wireless communication is disclosed. The apparatus includes at least one processor, and a memory coupled to the processor. The processor is configured to perform operations comprising generating, by a base station, at least one message including a list of SSB frequencies. At least one frequency included in the list of frequencies comprises an overlapping carrier or a non-overlapping carrier. The processor is further configured to perform operations comprising transmitting, by the base station, the at least one message to a user equipment (UE). The processor is also configured to perform operations comprising receiving, by the base station, a report based on new radio (NR) early measurement operations performed by the UE. The NR early measurement operations performed based on a determination of whether the at least one frequency is the overlapping carrier or a non-overlapping carrier In an additional aspect of the disclosure, an apparatus configured for wireless communication includes an interface configured to receive at least one message. The apparatus also includes a processor system configured to generate, by a base station, at least one message including a list of SSB frequencies. At least one frequency included in the list of frequencies comprises an overlapping carrier or a non-overlapping carrier. The processor system is further configured to transmit, by the base station, the at least one message to a user equipment (UE). The processor system is also configured to receive, by the base station, a report based on new radio (NR) early measurement operations performed by the UE. The NR early measurement operations performed based on a determination of whether the at least one frequency is the overlapping carrier or a non-overlapping carrier Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Figure 1:
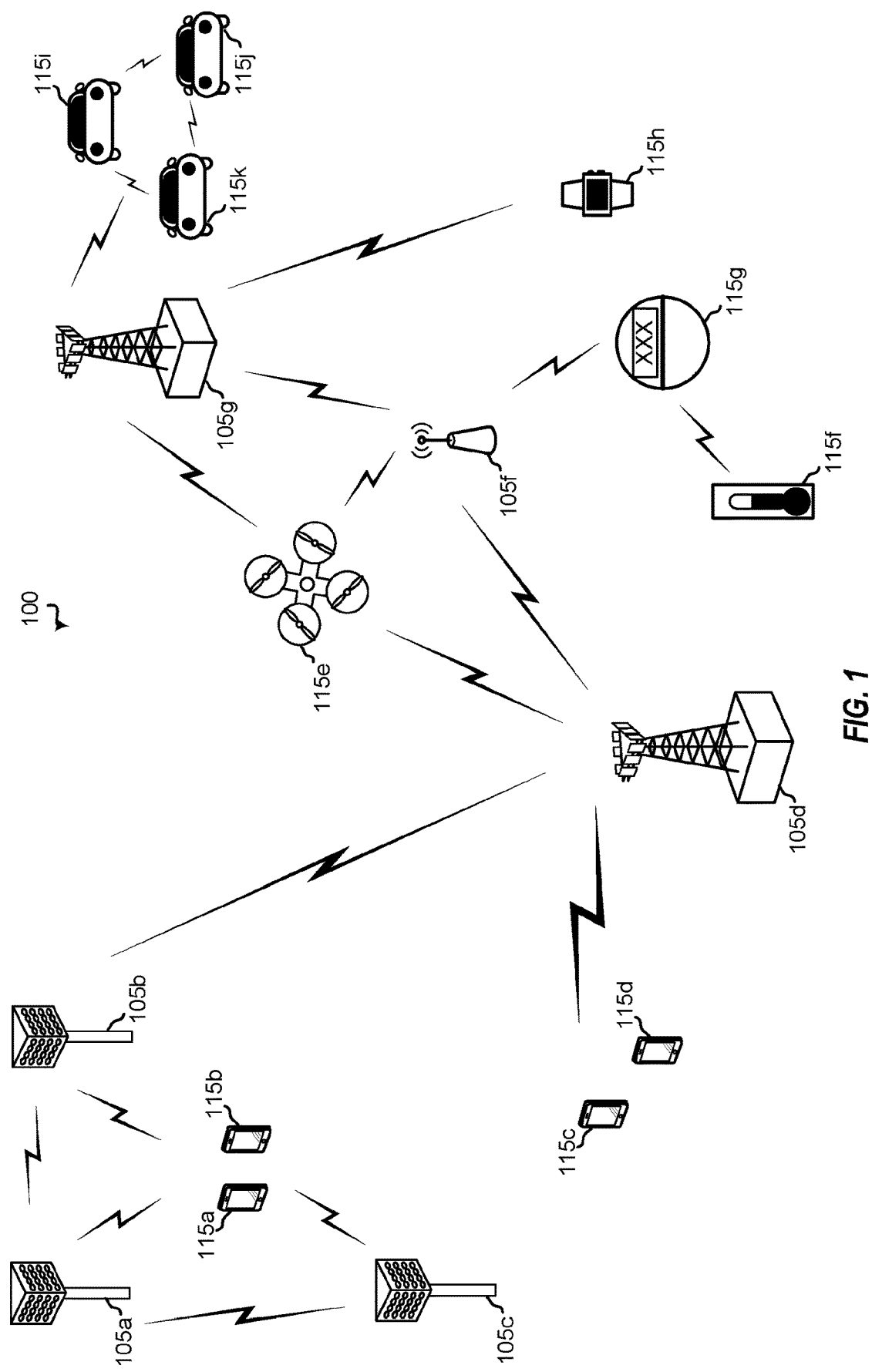
FIG. 1 is a block diagram illustrating details of an example wireless communication system.

The Appendix provides further details regarding various aspects of this disclosure and the subject matter therein forms a part of the specification of this application.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f* Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f* Wireless network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
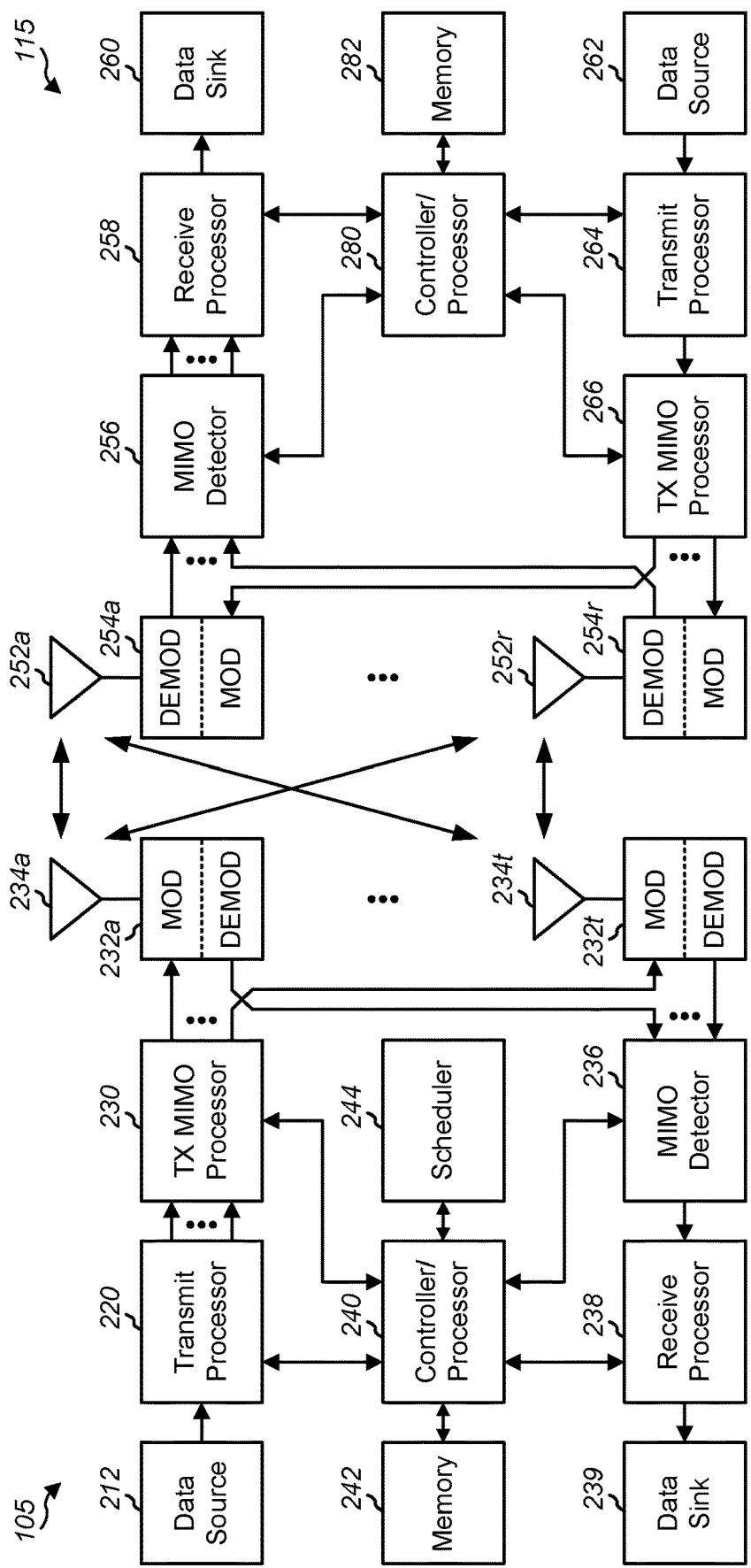
FIG. 2 is a block diagram conceptually illustrating an example design of a base station and a UE.

FIG. 2 shows a block diagram of a design of a base station 105 and a UE 115, which may be any of the base stations and one of the UEs in FIG. 1. For a restricted association scenario (as mentioned above), base station 105 may be small cell base station 105*f* in FIG. 1, and UE 115 may be UE 115*c* or 115D operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODS) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 4 and 5, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
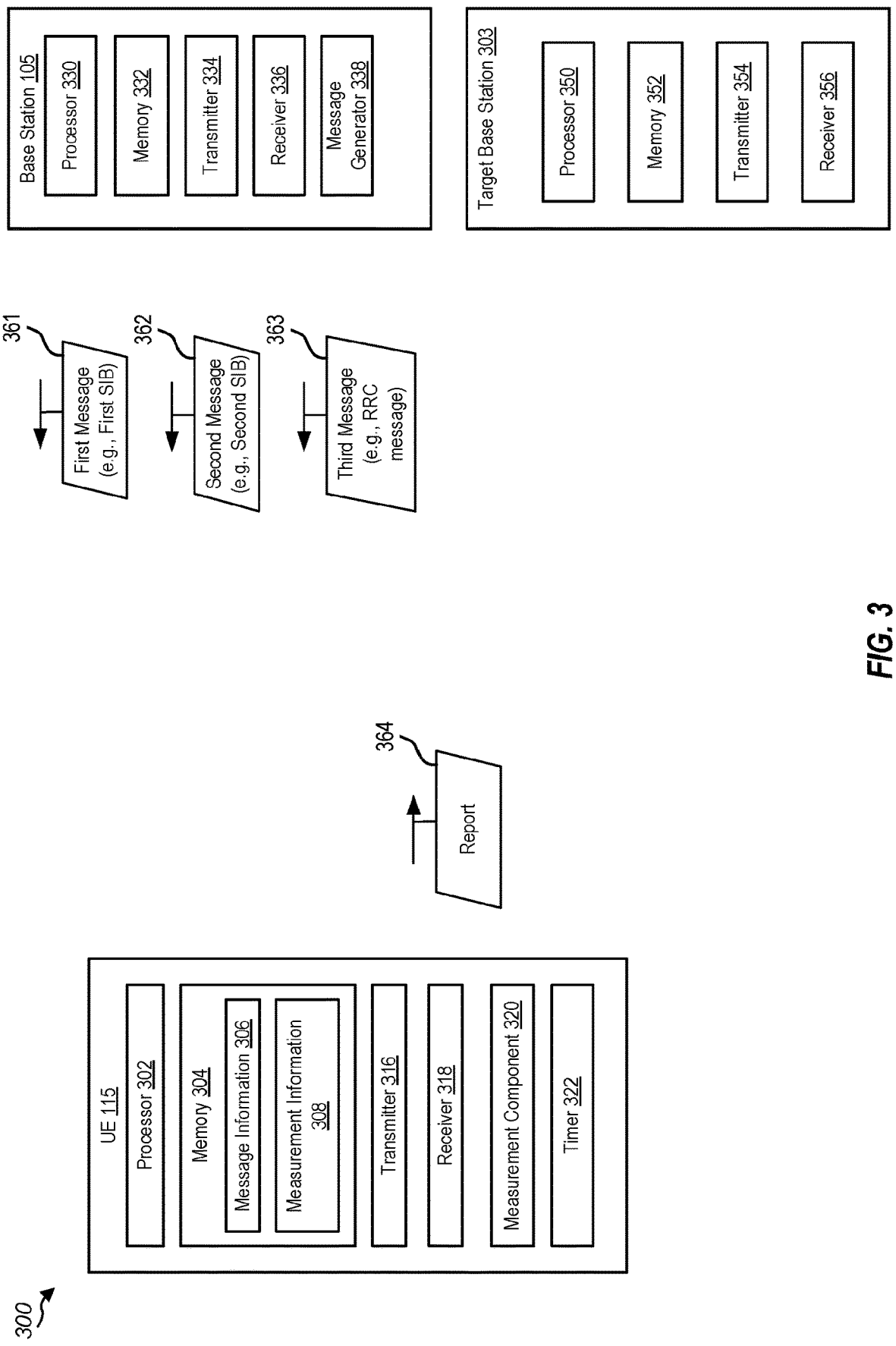
FIG. 3 is a block diagram of an example wireless communication system for obtaining a new radio early measurement configuration

FIG. 3 is a block diagram of an example wireless communications system 300 for obtaining a new radio early measurement configuration. In some examples, wireless communications system 300 may implement aspects of wireless communication system 100. For example, wireless communications system 300 may include UE 115, base station 105, and target base station 303. Target base station 303 may include or correspond to base station 105 such that target base station 303 includes one or more of the same components, is configured to perform one or more operation, or both, as described with reference to base station 105. Although one UE and two base stations are illustrated, in other implementations, wireless communications system 300 may include multiple UEs 115, a single base station 105 or more than two base stations 105, or both.

UE 115 includes a processor 302, a memory 304, a transmitter 316, a receiver 318, a measurement component 320, and a timer 322. Processor 302 may be configured to execute instructions stored at memory 304 to perform the operations described herein. In some implementations, processor 302 includes or corresponds to controller/processor 280, and memory 304 includes or corresponds to memory 282. In addition to the instructions stored at memory 304, memory 304 may be configured to store message information 306 and measurement information 308, as further described herein.

Message information 306 may include one or more values, parameters, settings, or configurations included in a message received by UE 115. For example, UE 115 may receive a first message 361, a second message 362, a third message 363, another message, or a combination thereof, as described further herein. For each message (e.g., a first message 361, a second message 362, a third message 363, or another message) received by UE 115, UE 115 may identify one or more values, parameters, settings, or configurations included in the message and store the one or more values, parameters, settings, or configurations included in a message at memory 304 as message information 306.

Measurement information 308 may include information obtained by UE 115 during one or more measurement operations, such as one or more early measurement operations performed by UE 115. The one or more measurement operations may be performed by UE 115 based on or using at least a portion of the message information 306, as described further herein. Based on the one or more measurement operations, UE 115 may generate and transmit a report 364.

Transmitter 316 is configured to transmit data to one or more other devices, and receiver 318 is configured to receive data from one or more other devices. For example, transmitter 316 may transmit data, and receiver 318 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 316 and receiver 318 may be replaced with a transceiver. Additionally, or alternatively, transmitter 316, receiver 318, or both may include or correspond to one or more components of UE 115 described with reference to FIG. 2.

Measurement component 320 is configured to perform one or more measurement operations, such as one or more early measurement operations. The one or more measurement operations may be performed by UE 115 based on or using at least a portion of the message information 306, as described further herein. Timer 322 is configured to determine or indicate one or more time periods, such as expiration of a time period having a duration indicated by message information 306.

Base station 105 includes a processor 330, a memory 332, a transmitter 334, a receiver 336, and a message generator 338. Processor 330 may be configured to execute instructions stored at memory 332 to perform the operations described herein. In some implementations, processor 330 includes or corresponds to controller/processor 240, and memory 332 includes or corresponds to memory 242.

Transmitter 334 is configured to transmit data to one or more other devices, and receiver 336 is configured to receive data from one or more other devices. For example, transmitter 334 may transmit data, and receiver 336 may receive data, via a network, such as a wired network, a wireless network, or a combination thereof. For example, base station 105 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 334 and receiver 336 may be replaced with a transceiver. Additionally, or alternatively, transmitter 334, receiver, 336, or both may include or correspond to one or more components of base station 105 described with reference to FIG. 2.

Message generator 338 is configured to generate one or more messages, such as first message 361, second message 362, third message 363, another message, or a combination thereof. In some implementations, first message 361, such as a first SIB, includes an NR SIB (e.g., an NR SIB2/4) or a legacy-based SIB (e.g., a SIB5, a SIB24, or the like). Additionally, second message 362, such a second SIB includes a NR SIB, such as a new NR SIB type. Additionally, third message 363, such as a RRC messages, includes a RRC release message or a NR release message.

In some implementations, both SSB related measurement configurations and frequency list for early measurement can be included in both RRC release message and LTE/NB SIB. For example, measurement configurations of SSB frequencies for cell selection/reselection are included in NR SIB2/4 or LTE SIB24 (legacy behavior). Additionally, or alternatively, measurement configurations of SSB frequencies only for early measurement can be included in LTE/NR RRC release message or SIB (NR SIB2 or a new NR SIB type, or LTE SIB5/SIB24/other). Additionally, or alternatively, list of SSB frequencies for early measurements can be included in LTE/NR RRC release message or SIB (NR SIB2 or a new NR SIB type, or LTE SIB5/SIB24/other). In some such implementations, if there is any difference in SSB measurement configuration or frequency list between RRC release message and SIB, UE 115 may override the SSB measurement configuration and frequency list indicated in SIB, or take common set of the SSB measurement configuration and frequency list in RRC release message and SIB. Additionally, or alternatively, in cell reselection, UE 115 may need to acquire SMTC of target cell from its SIB and replace the SMTC indicated in RRC release message, or NW can indicate in the RRC message whether UE 115 can still use SMTC (e.g. configuration of validity area) during cell reselection. It is noted, the NW may send the RRC release message to UE 115 when the network is synchronized.

First message 361 (e.g., a first SIB messages) may include includes first measurement configurations of SSB frequencies for cell selection/reselection. Each SSB frequency may correspond to an overlapping carrier. An overlapping carrier includes a carrier configured by a higher layer for both early measurement reporting and inter-frequency mobility measurements. For each measurement configuration included in the first measurement configurations, first message 361 may include SMTC information, subcarrier spacing information, SSB index information (e.g., an indication of which SSB to measure), frequency information (e.g., a frequency band indicator), measurement-type information (e.g., an RSSI measurement type), or cell quality derivation configuration (e.g., a threshold number of SSBs), a number of SSBs to average, a threshold number of SSBs to consolidate, additional information, or a combination thereof, as illustrative, non-limiting examples.

Second message 362 (e.g., a second SIB message) may include second measurement configurations of SSB frequencies only for early measurement, a first list of SSB frequencies for early measurements and associated cell list, first control signaling (e.g., common control signaling, or a combination thereof. Each SSB frequency may correspond to a non-overlapping carrier. A non-overlapping carrier includes a carrier configured by a higher layer for early measurement reporting and not for inter-frequency mobility measurements. For each measurement configuration included in the first measurement configurations of second message 362, the measurement configuration may include SMTC information, subcarrier spacing information, SSB index information (e.g., an indication of which SSB to measure), frequency information (e.g., a frequency band indicator), measurement-type information (e.g., an RSSI measurement type), or cell quality derivation configuration (e.g., a threshold number of SSBs), a number of SSBs to average, a threshold number of SSBs to consolidate, additional information, or a combination thereof, as illustrative, non-limiting examples. Each SSB frequency included in the first list of SSB frequencies may be an overlapping carrier or a non-overlapping carrier. The first control signaling may include a cell quality threshold, and indication of reporting quantity (e.g., RSRP/RSRQ/SINR) reporting, an indication of beam reporting, validity area if agreed, additional information, or a combination thereof, as illustrative, non-limiting examples.

Third message 363 (e.g., a RRC message) may include third measurement configurations of SSB frequencies only for early measurement, a second list of SSB frequencies for early measurements and associated cell list, second control signaling (e.g., common control signaling, a validity timer, or a combination thereof. Each SSB frequency may correspond to a non-overlapping carrier. For each measurement configuration included in the third measurement configurations, third message 363 may include SMTC information, subcarrier spacing information, SSB index information (e.g., an indication of which SSB to measure), frequency information (e.g., a frequency band indicator), measurement-type information (e.g., an RSSI measurement type), or cell quality derivation configuration (e.g., a threshold number of SSBs), a number of SSBs to average, a threshold number of SSBs to consolidate, additional information, or a combination thereof, as illustrative, non-limiting examples. Each SSB frequency included in the second list of SSB frequencies may be an overlapping carrier or a non-overlapping carrier. The second control signaling may include a cell quality threshold, and indication of reporting quantity (e.g., RSRP/RSRQ/SINR) reporting, an indication of beam reporting, validity area if agreed, additional information, or a combination thereof, as illustrative, non-limiting examples. The validity timer may indicate a time period (e.g., how long) during which information included in third message 363 is valid and/or a time period during which early measurement operations may be performed. After expiation of the time period, UE 115 may not rely on the information included in third message 363, may cease performing early measurement operations, and/or may acquire another third message 363 (e.g, another RRC message). In some implementations, third message 363 may also include one or more SMTCs of overlapping carriers.

Target base station 303 includes a processor 350, a memory 352, a transmitter 354, and a receiver 356. In some implementations, Processor 350 may be configured to execute instructions stores at memory 352 to perform the operations described herein.

Transmitter 354 is configured to transmit data to one or more other devices, and receiver 356 is configured to receive data from one or more other devices. For example, transmitter 354 may transmit data, and receiver 356 may receive data, via a network, such as a wired network, a wireless network, or a combination thereof. For example, target base station 303 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 354 and receiver 356 may be replaced with a transceiver.

In some examples, base stations 105, 303 may indicate in an RRC release message whether UE 115 may continue to use SMTC information during cell selection or cell reselection. In some examples, the base stations 105, 303 may transmit RRC release message when the wireless communications system 300 (e.g., network) is synchronized. Then, UE 115 may continue to use SMTC information indicated in an RRC release message during cell reselection. In some examples, base stations 105, 303 may indicate in an RRC release message the SSB frequencies for early measurement configurations. UE 115 may override frequencies indicated by legacy SIBs for cell reselection.

After performing idle state measurements or inactive state measurements, UE 115 may transmit a measurement report (e.g., 364) to base stations 105, 303 that includes measurements for synchronization signals or reference signals from corresponding base stations 105, 303. In some examples, based on measurement information in the measurement report, base station 105 may determine to pass on UE 115 to target base station 303. For example, measurements of synchronization signals or reference signals may indicate that target base station 303 has a better connection with UE 115, and base station 105 may handover communications with UE 115 to target base station 303. Additionally, or alternatively, UE 115 may move from a coverage area associated with base station 105 to a coverage area associated with target base station 303, and base station 105 may use the measurements in the measurement report to perform a handover to target base station 303. Accordingly, measurement report (et., 364) may include measurements for different SSB frequencies to facilitate movement of UE 115 from cell to cell (e.g., from base station to base station, from radio access technology to radio access technology, etc.).

During operation of system 300, one or more base stations 105 may generate and transmit first message 361 (e.g., a first SIB message), second message 362 (e.g., a second SIB message), third message 363 (e.g., the RRC message), or a combination thereof. UE 115 may receive, from the one or more base stations 105, first message 361, second message 362, and/or third message 363. In some implementations, UE 115 receives second message 362 and third message 363. It is noted that the second measurement configurations of second message 362 and the third measurement configurations of third message 363 may have the same early measurement configuration or may have different early measurement configurations. If UE 115 receives third message 363 having the third measurement configurations, the third measurement configurations override (e.g., take priority over) the second measurement configurations included in second message 362 (if the second measurement configurations were included in second message 362).

In some implementations, if third message 363 includes one or more SMTC related timing information elements (IEs), UE 115 may consider the network (NW) to be synchronized (for SMTC handling during cell reselection). In such implementations, UE 115 may avoid broadcasting signaling in case of synchronized network, and thereby conserver resources and power. Additionally, or alternatively, in some implementations, if one or more SMTC related timing IEs are only received at UE 115 in second message 362, UE 115 may need to or may be required to acquire (or re-acquire) SMTC (timing) from a message, such as a SIB message, of a target cell (e.g., target base station 303) after cell reselection.

In a first illustrative example of operation of wireless communications system 300, UE 115 may determine whether UE 115 received third message 363. If UE 115 received third message 363, UE 115 determines whether third message 363 includes the second list of SSB frequencies. Based on a determination that third message 363 included the second list of SSB frequencies, UE 115 selects the second list of SSB frequencies as a selected frequency list. Alternatively, based on a determination that third message 363 did not include the second list of SSB frequencies, UE 115 selects the first list of SSB frequencies (of second message 362) as the selected frequency list. Additionally, if UE 115 did not receive third message 363, UE 115 may select the first list of SSB frequencies (of second message 362) as the selected frequency list.

For each frequency included in the selected frequency list, UE 115 determines whether the frequency is an overlapping carrier or a non-overlapping carrier. Based on a determination the a frequency is an overlapping carrier, UE 115 uses a time of its SMTC provided in first message 361. Additionally, UE 115 may re-acquire a SMTC of a target cell its SIB message during cell reselection.

Alternatively, based on a determination that a frequency is a non-overlapping carrier, UE may determine whether or not its SMTC is provided in third message 363, whether or not its SMTC is provided in second message 362, whether its SMTC is not provided in both third message 363 and second message 362, or a combination thereof.

Based on a determination that that its SMTC is provided in third message 363, UE 115 may regard the NW as synchronized. Additionally, or alternatively, based on the determination that that its SMTC is provided in third message 363, UE 115 may use the timing of the SMTC included in third message 363. In some implementations, UE 115 may use the timing the SMTC included in third message 363 before cell reselection, after cell reselection, or both. Based on a determination its SMTC is not provided in third message 363 and is provided in second message 362, UE 115 may use the SMTC provided in second message 362. Additionally, or alternatively, based on the determination its SMTC is not provided in third message 363 and is provided in second message 362, UE 115 may re-acquire a SMTC of a target cell from its SIB message during cell reselection. Based on a determination that its SMTC is not provided in both third message 363 and second message 362, UE 115 may abstain from performing NR early measurement for the frequency.

In some implementations, UE 115 may determine whether third message 363 includes control signaling, such as the second control signaling. Based on a determination that third message 363 includes the control signaling, UE 115 may use the second control signaling, such as cell quality threshold, indication of reporting quantity (RSRP/RSRQ/SINR) reporting, indication of beam reporting, validity area, or a combination thereof. Based on a determination that third message 363 does not include control signaling, UE 115 may use first control signaling (e.g., cell quality threshold, indication of reporting quantity (RSRP/RSRQ/SINR) reporting, indication of beam reporting, validity area, or a combination thereof) of second message 362.

In some implementations, UE 115 may determine whether third message 363 includes the validity timer. Based on a determination that third message 363 includes the validity timer, UE 115 may identify an expiration time of the validity timer. In some implementations, UE 115 may initiate a timer (for a time period indicated by the validity time) based on identification of the validity timer. UE 115 may use information included in third message 363 and/or perform early measurements prior to expiration of the validity timer. After expiration of the time period corresponding to the validity time, UE 115 may no longer rely on or use information included in third message 363 and/or may no longer perform early measurement.

In a second illustrative example of operation of wireless communications system 300, one or more SMTCs of overlapping carriers may be included in third message 363. For example, third message 363 may include one or more measurement configurations, such as a first set of one or more measurement configurations of SSB frequencies for cell selection/reselection, a second set of one or more measurement configurations of SSB frequencies only for early measurement, or a combination thereof. Each frequency include in the first set of one or more measurement configurations may correspond to an overlapping carrier, and each frequency include in the second set of one or more measurement configurations may correspond to a non-overlapping carrier. For each measurement configuration included in the first set of one or more first measurement configurations, first message 361 includes SMTC information, subcarrier spacing information, SSB index information (e.g., an indication of which SSB to measure), frequency information (e.g., a frequency band indicator), measurement-type information (e.g., an RSSI measurement type), or cell quality derivation configuration (e.g., a threshold number of SSBs), a number of SSBs to average, a threshold number of SSBs to consolidate, additional information, or a combination thereof, as illustrative, non-limiting examples. In some implementations, the first set of measurement configurations may include or correspond to the first measurement configurations. For each measurement configuration included in the second set of one or more measurement configurations, third message 363 includes SMTC information, subcarrier spacing information, SSB index information (e.g., an indication of which SSB to measure), frequency information (e.g., a frequency band indicator), measurement-type information (e.g., an RSSI measurement type), or cell quality derivation configuration (e.g., a threshold number of SSBs), a number of SSBs to average, a threshold number of SSBs to consolidate, additional information, or a combination thereof, as illustrative, non-limiting examples. In some implementations, the second set of measurement configurations may include or correspond to the second measurement configurations or the third measure configurations.

Each

If the one or more SMTCs of overlapping carriers are included in third message 363, UE 115 may regard the NW as synchronized. In such implementations, UE 115 may use a timing of a SMTC included in third message 363 prior to cell reselection, after cell reselection, or both. Additionally, or alternatively, UE 115 allowed to not re-acquire SMTC timing of target cell from its SIB message during cell reselection even if only overlapping carriers are to be measured. To illustrate, UE 115 may not re-acquire SMTC timing of target cell from its SIB message during cell reselection even if only overlapping carriers are required to be measured.

Regarding the second example of operation of UE 115, UE 115 may determine whether UE 115 received third message 363. If UE 115 received third message 363, UE 115 determines whether third message 363 includes the second list of SSB frequencies. Based on a determination that third message 363 included the second list of SSB frequencies, UE 115 selects the second list of SSB frequencies as a selected frequency list. Alternatively, based on a determination that third message 363 did not include the second list of SSB frequencies, UE 115 selects the first list of SSB frequencies (of second message 362) as the selected frequency list. Additionally, if UE 115 did not receive third message 363, UE 115 may select the first list of SSB frequencies (of second message 362) as the selected frequency list.

For each frequency included in the selected frequency list, UE 115 determines whether the frequency is an overlapping carrier or a non-overlapping carrier. Based on a determination the a frequency is an overlapping carrier, UE 115 may determine whether or not its SMTC is provided in third message 363, whether or not its SMTC is provided in first message 361, whether its SMTC is not provided in both third message 363 and first message 361, or a combination thereof.

Based on a determination that that its SMTC is provided in third message 363, UE 115 may regard the NW as synchronized. Additionally, or alternatively, based on the determination that that its SMTC is provided in third message 363, UE 115 may use the timing of the SMTC included in third message 363. In some implementations, UE 115 may use the timing the SMTC included in third message 363 before cell reselection, after cell reselection, or both. Based on a determination its SMTC is not provided in third message 363 and is provided in first message 361, UE 115 may use the SMTC provided in second message 362. Additionally, or alternatively, based on the determination its SMTC is not provided in third message 363 and is provided in first message 361, UE 115 may acquire a SMTC of a target cell from its SIB message. Based on a determination that its SMTC is not provided in both third message 363 and first message 361, UE 115 may abstain from performing NR early measurement for the frequency.

Alternatively, based on a determination that a frequency is a non-overlapping carrier, UE may determine whether or not its SMTC is provided in third message 363, whether or not its SMTC is provided in second message 362, whether its SMTC is not provided in both third message 363 and second message 362, or a combination thereof.

Based on a determination that that its SMTC is provided in third message 363, UE 115 may regard the NW as synchronized. Additionally, or alternatively, based on the determination that its SMTC is provided in third message 363, UE 115 may use the timing of the SMTC included in third message 363. In some implementations, UE 115 may use the timing the SMTC included in third message 363 before cell reselection, after cell reselection, or both. Based on a determination its SMTC is not provided in third message 363 and is provided in second message 362, UE 115 may use the SMTC provided in second message 362. Additionally, or alternatively, based on the determination its SMTC is not provided in third message 363 and is provided in second message 362, UE 115 may re-acquire a SMTC of a target cell from its SIB message during cell reselection. Based on a determination that its SMTC is not provided in both third message 363 and second message 362, UE 115 may abstain from performing NR early measurement for the frequency.

In some implementations, UE 115 may determine whether third message 363 includes control signaling, such as the second control signaling. Based on a determination that third message 363 includes the control signaling, UE 115 may use the second control signaling, such as cell quality threshold, indication of reporting quantity (RSRP/RSRQ/SINR) reporting, indication of beam reporting, validity area, or a combination thereof. Based on a determination that third message 363 does not include control signaling, UE 115 may use first control signaling (e.g., cell quality threshold, indication of reporting quantity (RSRP/RSRQ/SINR) reporting, indication of beam reporting, validity area, or a combination thereof) of second message 362.

In some implementations, UE 115 may determine whether third message 363 includes the validity timer. Based on a determination that third message 363 includes the validity timer, UE 115 may identify an expiration time of the validity timer. In some implementations, UE 115 may initiate a timer (for a time period indicated by the validity time) based on identification of the validity timer. UE 115 may use information included in third message 363 and/or perform early measurement operations prior to expiration of the validity timer. After expiration of the time period corresponding to the validity time, UE 115 may no longer rely on or use information included in third message 363 and/or may not longer perform early measurement operations.

As described with reference to the above first and second illustrative examples, one or more operations of UE 115 are described for obtaining NR early measurement configuration. For example, the first and second examples describe one or more operations of UE 115 for obtaining timing reference for SMTC info in early measurement configuration when serving cell changes is not clear, such as when UE receives SMTC info (based on timing reference of PCell) for early measurement included in third message 363 is included in third message 363 and UE 115 moves to another cells (other than the original PCell) that may or may not be synchronized with the original PCell. It is understood that one or more base stations 105 may perform corresponding operation, such as messaging, to transmit one or more messages to UE 115. Accordingly, the described techniques with reference to at least the first and second example, may therefore include features for improved coverage and reliability for wireless communications and, in some examples, may promote low latency for wireless communications relating to multiple radio access technologies, among other benefits.

The wireless communications system 300 may therefore realize one or more advantages. The described techniques in the wireless communications system 300 may support improvements in power savings, among other advantages. As such, supported techniques may include improved UE 115 operations and, in some examples, may promote UE 115 efficiencies, UE 115 coverage, among other benefits. For example, UE 115 may experience reduced overhead signaling for idle state measurements and inactive state measurements.

Figures 4, 5:
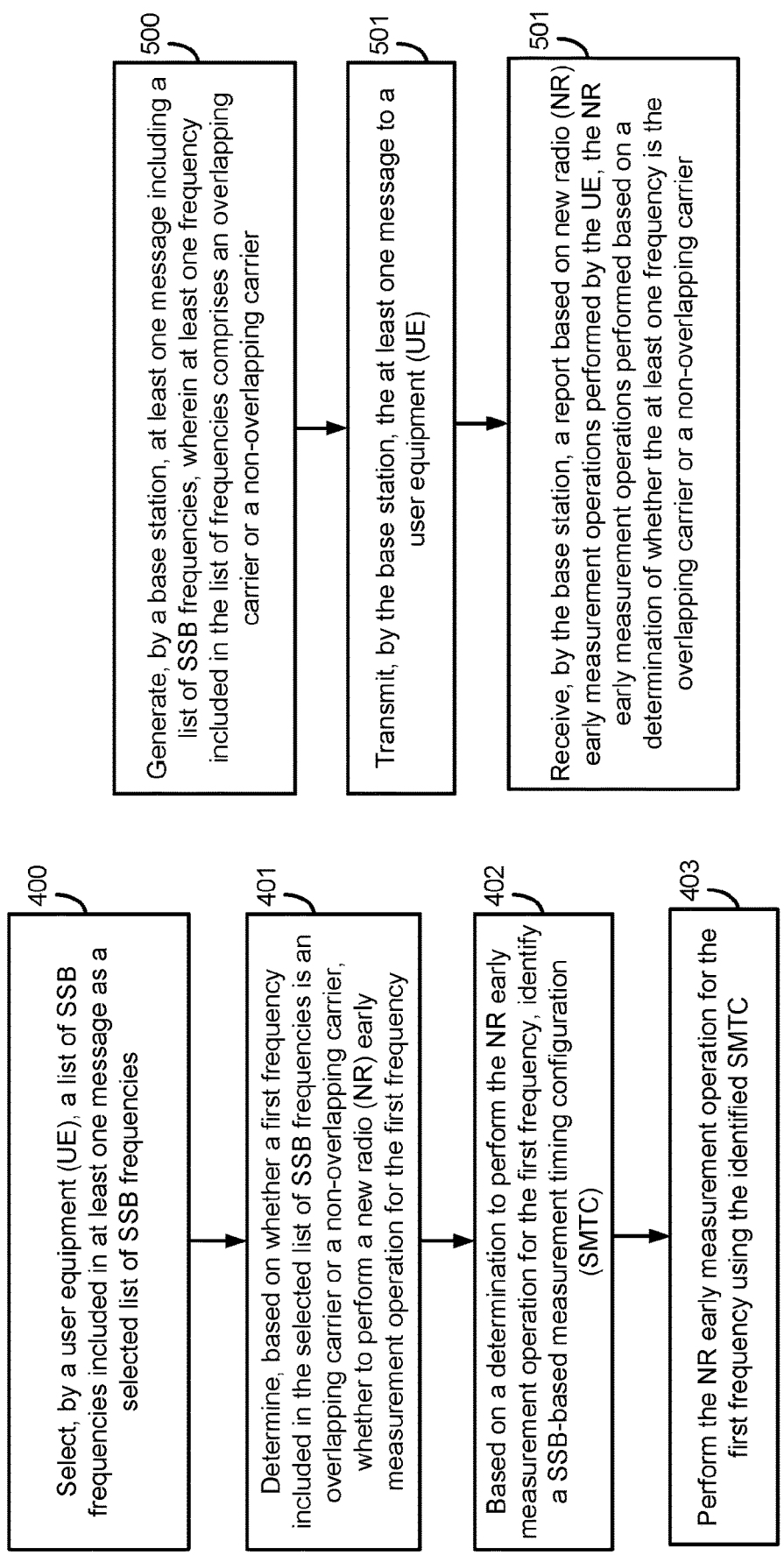
FIG. 4 is a block diagram illustrating example blocks executed by a UE.
FIG. 5 is a block diagram illustrating example blocks executed by a base station.
Figure 6:
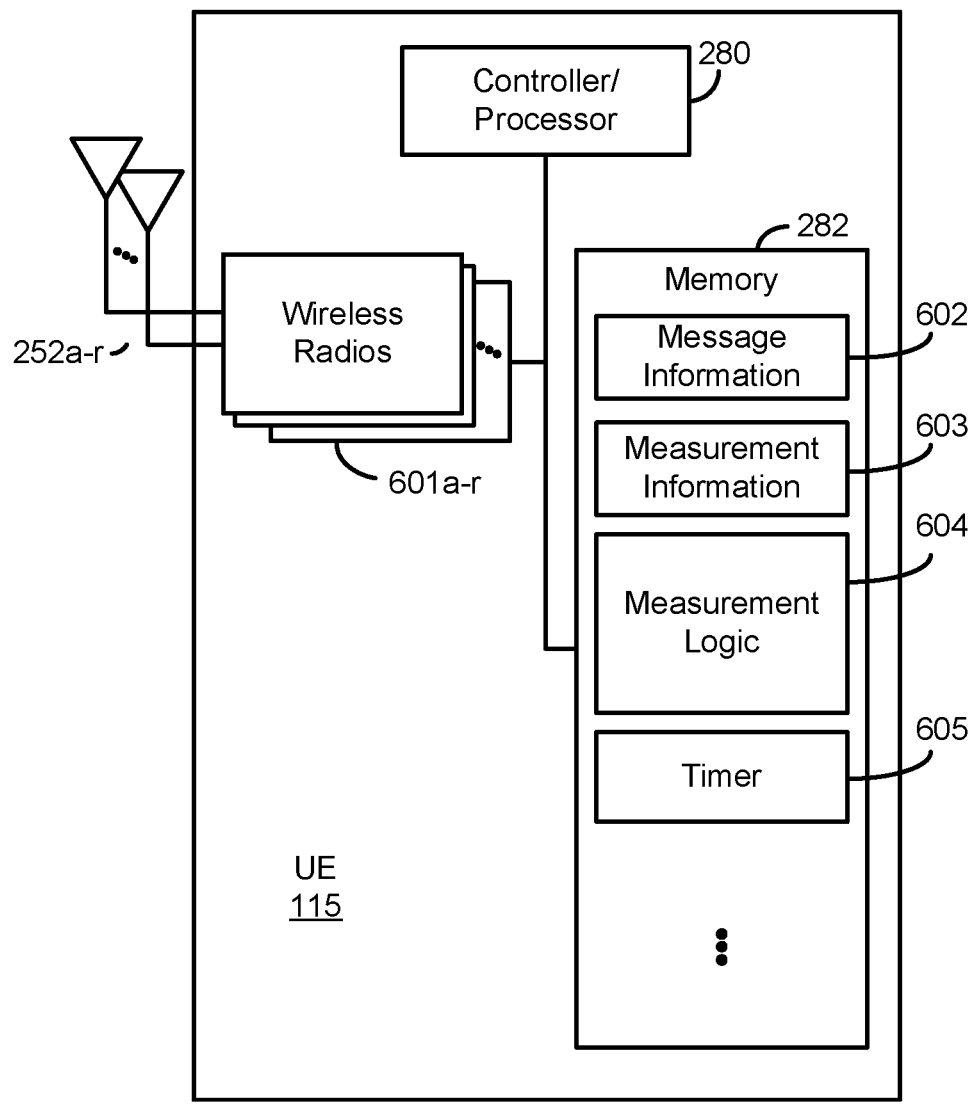
FIG. 6 is a block diagram conceptually illustrating an example design of a UE.

FIG. 4 is block diagram illustrating example blocks executed by a UE. The example blocks will also be described with respect to UE 115 as illustrated in FIG. 6. FIG. 6 is a block diagram illustrating UE 115 configured according to one aspect of the present disclosure. UE 115 includes the structure, hardware, and components as illustrated for UE 115 of FIG. 2 or 3. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 601*a-r* and antennas 252*a-r*. Wireless radios 601*a-r* includes various components and hardware, as illustrated in FIG. 2 for UE 115, including modulator/demodulators 254*a-r*, MIMO detector 256, receive processor 258, transmit processor 264, and TX MIMO processor 266.

Figure 7:
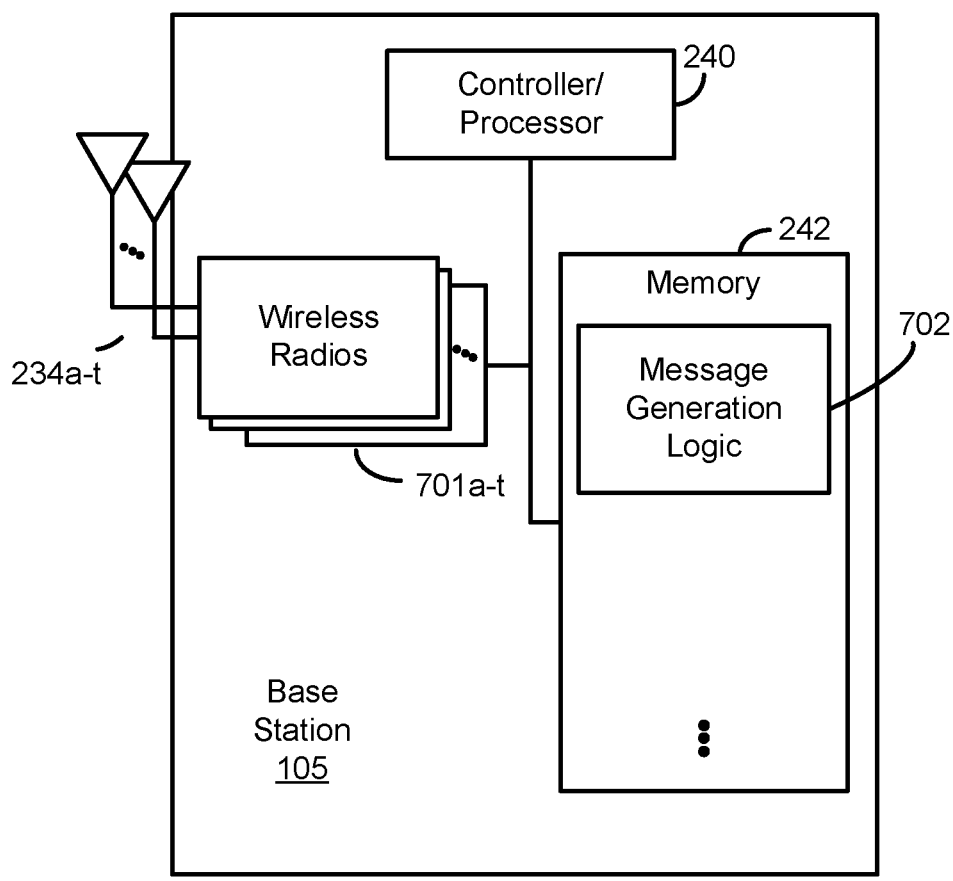
FIG. 7 is a block diagram conceptually illustrating an example design of a base station.

As shown, memory 282 may include message information 602, measurement information 603, measurement logic 1004, and a timer 605. Message information 602, measurement information 603, measurement logic 1004, and timer 605 may include or correspond to message information 306, measurement information 308, measurement component 320, and timer 322, respectively. UE 115 may receive signals from and/or transmit signal to a base station, such as base station 105, target base station 303, or base station 105 as illustrated in FIG. 7.

Referring to FIG. 4, at block 400, the UE selects a list of synchronization signal block (SSB) frequencies included in at least one message as a selected list of SSB frequencies. For example, UE 115 may select the list of SSB frequencies from message information.

At block 401, the UE determines, based on whether a first frequency included in the selected frequency list is an overlapping carrier or a non-overlapping carrier, whether to perform a new radio (NR) early measurement operation for the first frequency. The overlapping carrier may include a carrier configured by higher layer for both early measurement reporting and inter-frequency mobility measurements. The non-overlapping carrier may include a carrier configured by higher layer for early measurement reporting while not configured for inter-frequency mobility measurements.

At block 402, the UE identifies a SSB-based measurement timing configuration (SMTC) based on a determination to perform the NR early measurement operation for the first frequency. For example, measurement logic 604 may identify the SMTC.

At block 403, the UE performs the NR early measurement operation for the first frequency using the identified SMTC. For example, measurement logic 604 may identify the SMTC. In some implementations, UE may generate a measurement report based on the measuring operation. The measurement report may include or correspond to report 364.

In some implementations, a block may be included in which the UE receives the at least one message comprising a first message, a second message, a third message or a combination thereof. each of the first message and the second message include a system information block (SIB) message. The first message, the second message, and the third message may include or correspond to first message 361, second message 362, and third message 363, respectively. The first message may include a new radio (NR) SIB or a legacy-based SIB. For example, the first message may include an NR SIB2/4 message, a SIBS message, or a SIB24 message. The second message may include a NR SIB. The third message may include a radio resource controller (RRC) release message or a new radio (NR) release message.

In some implementations, a block may be included in which the UE determines whether the third message is received. Additionally, or alternatively, UE may determine whether the second message includes a first list of SSB frequencies, or whether the third message includes a second list of SSB frequencies. Based on a determination that the third message includes the second list of SSB frequencies, the UE may select the second list of SSB frequencies as the selected list of SSB frequencies. Alternatively, based on a determination that the third message does not include the second list of SSB frequencies and a determination that the second message includes the first list of SSB frequencies, the UE may select the first list of SSB frequencies as the selected list of SSB frequencies.

In some implementations, a block may be included in which the UE selects a first SMTC of the first message as the SMTC based on a determination the frequency is the overlapping carrier. In some such implementations the UE performs cell selection. During the cell reselection, the UE may receive a SIB message from a target base station, such as target base station 303. The UE may identify a second SMTC of the SIB message received from the target base station.

In some implementations, a block may be included in which the UE determines whether the SMTC is included in the third message based on a determination that the frequency is the overlapping carrier. Based on a determination that that SMTC is included in the third message, the UE determines that a network is synchronized. In some such implementations, the UE may perform cell reselection and, after cell reselection, use the SMTC identified prior to performance of the cell reselection.

In some implementations, a block may be included in which the UE determines whether the SMTC is included in the first message based on a determination that that SMTC is not included in the third message. Based on a determination that the SMTC is included in the first message, the UE selects a second SMTC of the second message as the SMTC. In some such implementations, the UE performs cell selection and receives a SIB message from a target base station during cell reselection. The UE may identify a second SMTC of the SIB message received from the target base station.

In some implementations, a block may be included in which the UE is allowed to not perform NR early measurement for the first frequency. Additionally, or alternatively, for a second frequency in the list of SSB frequencies. In some such implementations, the UE may select a third frequency without performing NR early measurement for the second frequency based on determining for a second frequency included in the selected frequency list that the second frequency is the overlapping carrier, that the SMTC is not included in the third message, that the SMTC is not included in the first message, or a combination thereof.

In some implementations, a block may be included in which the UE determines whether the SMTC is included in the third message in response to a determination that the frequency is the non-overlapping carrier. The UE may determine that a network is synchronized based on a determination that that SMTC is included in the third message. In some such implementations, the UE performs cell reselection and, after cell reselection, uses the SMTC identified prior to performance of the cell reselection.

In some implementations, a block may be included in which the UE determines whether the SMTC is included in the second message in response to a determination that that SMTC is not included in the third message. The UE may select a second SMTC of the second message as the SMTC based on a determination that the SMTC is included in the second message. In some such implementations, the UE performs cell selection, receives SIB message from a target base station during cell reselection, and identifies a second SMTC of the SIB message received from the target base station.

In some implementations, a block may be included in which the UE selects, a third frequency without performing NR early measurement for a second frequency based on determining for a second frequency included in the selected frequency list that the second frequency is the non-overlapping carrier, that the SMTC is not included in the third message, and that the SMTC is not included in the second message.

In some implementations, a block may be included in which the UE identifies common control signaling included in at least one message. In some such implementations, the UE sets the identified common control signaling as selected common control signaling and performs, for the first frequency, NR early measurement based on the selected common control signaling. The identified common control signaling may include a cell quality threshold, an indication of reporting quantity reporting, an indication of beam reporting, a validity area, or a combination thereof. Additionally, in some implementations, a block may be included in which the UE determines whether the second message includes first common control signaling or whether the third message includes second common control signaling. Based on or in response to a determination that the third message includes the second common control signaling, the UE selects the second common control signaling as the selected common control signaling. Alternatively, based on or in response to a determination that the third message does not include the second common control signaling and a determination that the second message includes the first common control signaling, the UE may selects the first common control signaling as the selected common control signaling.

In some implementations, a block may be included in which the UE determines whether the third message includes a validity timer. If the UE determines the validity timer is included in the third message, the UE may perform, for the first frequency, NR early measurement based on the validity timer.

It is noted that one or more blocks (or operations) described with reference to FIG. 4 may be combined with one or more blocks (or operations) of another of figure. For example, one or more blocks of FIG. 4 may be combined with one or more blocks (or operations) of another of FIG. 2, 3, or 6. Additionally, or alternatively, one or more operations described above with reference to FIG. 1 may be combine with one or more operations described with reference to FIG. 7.

FIG. 5 is block diagrams illustrating example blocks executed by a base station configured according to an aspect of the present disclosure. The example blocks will also be described with respect to base station 105 as illustrated in FIG. 7, which may include or correspond to base station 105 or target base station 303 of FIG. 3. FIG. 7 is a block diagram illustrating base station 105 configured according to one aspect of the present disclosure. Base station 105 includes the structure, hardware, and components as illustrated for base station 105 of FIG. 2 or 4. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 701a-t and antennas 234a-t. Wireless radios 701a-t includes various components and hardware, as illustrated in FIG. 2 for base station 105, including modulator/demodulators 232a-t, transmit processor 220, TX MIMO processor 230, MIMO detector 236, and receive processor 238. As shown, memory 242 may include message generation logic 702. Message generation logic 702 may include or correspond to message generator 338. In some aspects, message generation logic 702 may include or correspond to processor(s) 302. Base station 105 may receive signals from and/or transmit signal to a UE, such as UE 115 as illustrated in FIG. 6.

Referring to FIG. 5, at block 500, the base station generates at least one message including a list of SSB frequencies. At least one frequency included in the list of frequencies comprises an overlapping carrier or a non-overlapping carrier. For example, the base station 105 may generate the at least one message using message generation logic 702. The overlapping carrier includes a carrier configured by higher layer for both early measurement reporting and inter-frequency mobility measurements. The non-overlapping carrier includes a carrier configured by higher layer for early measurement reporting while not configured for inter-frequency mobility measurements.

At block 501, the base station transmits the at least one message to a user equipment (UE). For example, the base station 105 may transmit the at least one message using wireless radios 701a-t and antennas 234a-t.

At block 02, the base station receives a report based on new radio (NR) early measurement operations performed by the UE. The NR early measurement operations performed based on a determination of whether the at least one frequency is the overlapping carrier or a non-overlapping carrier. For example, the base station 105 may receive the report using wireless radios 701a-t and antennas 234a-t. The report may include or correspond to report 364.

The at least one message may include a first message, a second message, a third message or a combination thereof. The first message, the second message, and the third message may include or correspond to first message 361, second message 362, and third message 363, respectively. In some implementations, each of the first message and the second message include a system information block (SIB) message. The first message may include a new radio (NR) SIB or a legacy-based SIB. For example, the first message includes an NR SIB2/4 message, a SIB5 message, or a SIB24 message. In some implementations, the second message may include a NR SIB. Additionally or alternatively, the third message may include a radio resource controller (RRC) release message or a new radio (NR) release message. In some implementations, the third message includes a SSB-based measurement timing configuration (SMTC) is included in the third message based on a determination that the frequency is the overlapping carrier. The SMTC may correspond to an overlapping carrier. Additionally, or alternatively, the third message may include common control signaling, a validity timer, or both.

It is noted that one or more blocks (or operations) described with reference to FIG. 5 may be combined with one or more blocks (or operations) of another of figure. For example, one or more blocks of FIG. 5 may be combined with one or more blocks (or operations) of another of FIG. 2, 3, or 7. Additionally, or alternatively, one or more operations described above with reference to FIGS. 1-3 may be combine with one or more operations described with reference to FIG. 5.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to 2, 4, and 5 may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 4 and 5) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
   selecting, by a user equipment (UE), a list of synchronization signal block (SSB) frequencies included in at least one message as a selected list of SSB frequencies;
   determining, based on whether a first frequency included in the selected frequency list is an overlapping carrier or a non-overlapping carrier, whether to perform a new radio (NR) early measurement operation for the first frequency;
   identifying a SSB-based measurement timing configuration (SMTC) based on a determination to perform the NR early measurement operation for the first frequency; and
   performing the NR early measurement operation for the first frequency using the identified SMTC.

2. The method of claim 1, wherein:
   the overlapping carrier comprises a carrier configured by higher layer for both early measurement reporting and inter-frequency mobility measurements; and
   the non-overlapping carrier comprises a carrier configured by higher layer for early measurement reporting while not configured for inter-frequency mobility measurements.

3. The method of claim 1, further comprising:
   generating, by the UE, a measurement report based on the NR early measurement operation.

4. The method of claim 1, further comprising:
   receiving, by the UE, the at least one message comprising a first message, a second message, a third message, or a combination thereof.

5. The method of claim 4, wherein:
   each of the first message and the second message include a system information block (SIB) message,
   the first message includes an new radio (NR) SIB or a legacy-based SIB, or
   a combination thereof.

6. The method of claim 4, wherein:
   the first message includes an NR SIB2/4 message, a SIB5 message, or a SIB24 message,
   the second message includes a NR SIB,
   the third message includes a radio resource controller (RRC) release message or a new radio (NR) release message, or
   a combination thereof.

7. The method of claim 4, further comprising:
   determining, by the UE, whether the third message is received.

8. The method of claim 4, further comprising:
   determining, by the UE, whether the second message includes a first list of SSB frequencies; or
   determining, by the UE, whether the third message includes a second list of SSB frequencies,
   wherein, based on a determination that the third message includes the second list of SSB frequencies, the UE selects the second list of SSB frequencies as the selected list of SSB frequencies.

9. The method of claim 4, further comprising:
   determining, by the UE, whether the second message includes a first list of SSB frequencies; or
   determining, by the UE, whether the third message includes a second list of SSB frequencies,
   wherein, based on a determination that the third message does not include the second list of SSB frequencies and a determination that the second message includes the first list of SSB frequencies, the UE selects the first list of SSB frequencies as the selected list of SSB frequencies.

10. The method of claim 4, further comprising:
    for the first frequency, selecting, by the UE, a first SMTC of the first message as the SMTC based on a determination the first frequency is the overlapping carrier;
    performing, by the UE, cell selection; and
    receiving, by the UE during cell reselection, a SIB message from a target base station; and
    identifying, by the UE, a second SMTC of the SIB message received from the target base station.

11. An apparatus configured for wireless communication, comprising:
    at least one processor; and
    a memory coupled to the at least one processor,
    wherein the at least one processor is configured to:
      select, by a user equipment (UE), a list of synchronization signal block (SSB) frequencies included in at least one message as a selected list of SSB frequencies;
      determine, based on whether a first frequency included in the selected list of SSB frequencies is an overlapping carrier or a non-overlapping carrier, whether to perform a new radio (NR) early measurement operation for the first frequency;
      identify a SSB-based measurement timing configuration (SMTC) based on a determination to perform the NR early measurement operation for the first frequency; and
      initiate the NR early measurement operation for the first frequency using the identified SMTC.

12. The apparatus of claim 11, wherein the at least one processor is further configured to:
    receive, by the UE, the at least one message comprising a first message, a second message, a third message, or a combination thereof.

13. The apparatus of claim 12, wherein the at least one processor is further configured to, for the first frequency:
    determine, by the UE, whether the SMTC is included in the third message based on a determination that the first frequency is the non-overlapping carrier.

14. The apparatus of claim 13, wherein the at least one processor is further configured to:
    determine, by the UE, that a network is synchronized based on a determination that that SMTC is included in the third message;
    initiate, by the UE, a cell reselection operation; and
    after cell reselection, use, by the UE, the SMTC identified prior to performance of the cell reselection.

15. The apparatus of claim 13, wherein the at least one processor is further configured to:
    for the first frequency, determine, by the UE, whether the SMTC is included in the second message based on a determination that that SMTC is not included in the third message;
    for the first frequency, select, by the UE, a second SMTC of the second message as the SMTC based on a determination that the SMTC is included in the second message;
    initiate, by the UE, a cell selection operation;
    receive, by the UE during cell reselection, a SIB message from a target base station; and
    identify, by the UE, a second SMTC of the SIB message received from the target base station.

16. The apparatus of claim 13, wherein the at least one processor is further configured to:

for the first frequency, determine, by the UE, whether the SMTC is included in the second message based on a determination that that SMTC is not included in the third message; and based on determining for a second frequency included in the selected frequency list that the second frequency is the non-overlapping carrier, that the SMTC is not included in the third message, and that the SMTC is not included in the second message, select, by the UE, a third frequency without performing NR early measurement for the second frequency.

17. The apparatus of claim 12, wherein the at least one processor is further configured to:
identify, by the UE, common control signaling included in at least one message;
set, by the UE, the identified common control signaling as selected common control signaling; and
initiate, by the UE for the first frequency, NR early measurement based on the selected common control signaling, and
wherein the identified common control signaling includes a cell quality threshold, an indication of reporting quantity reporting, an indication of beam reporting, a validity area, or a combination thereof.

18. The apparatus of claim 17, wherein the at least one processor is further configured to:
determine, by the UE, whether the second message includes first common control signaling; or
determine, by the UE, whether the third message includes second common control signaling,
wherein, based on a determination that the third message includes the second common control signaling, the UE selects the second common control signaling as the selected common control signaling.

19. The apparatus of claim 17, wherein the at least one processor is further configured to:
determine, by the UE, whether the second message includes first common control signaling; or
determine, by the UE, whether the third message includes second common control signaling,
wherein, based on a determination that the third message does not include the second common control signaling and a determination that the second message includes the first common control signaling, the UE selects the first common control signaling as the selected common control signaling.

20. The apparatus of claim 11, wherein the at least one processor is further configured to:
determine, by the UE, whether the at least one message includes a validity timer; and
initiate, by the UE for the first frequency, NR early measurement based on the validity timer.

21. An apparatus configured for wireless communication, the apparatus comprising:
an interface configured to receive at least one message; and
a processing system configured to:
select, by a user equipment (UE), a list of synchronization signal block (SSB) frequencies included in the at least one message as a selected list of SSB frequencies;
determine, based on whether a first frequency included in the selected list of SSB frequencies is an overlapping carrier or a non-overlapping carrier, whether to perform a new radio (NR) early measurement operation for the first frequency;
identify a SSB-based measurement timing configuration (SMTC) based on a determination to perform the NR early measurement operation for the first frequency; and
initiate the NR early measurement operation for the first frequency using the identified SMTC.

22. The apparatus of claim 21, further comprising:
a receiver configured to receive the at least one message.

23. The apparatus of claim 21, wherein the processing system is further configured to:
select, by the UE, a first SMTC of the at least one message as the SMTC based on a determination the first frequency is the overlapping carrier.

24. The apparatus of claim 21, wherein the processing system is further configured to:
determine, by the UE, whether the SMTC is included in the at least one message based on a determination that the first frequency is the non-overlapping carrier.

25. A method of wireless communication, the method comprising:
generating, by a base station, at least one message including a list of SSB frequencies, wherein at least one frequency included in the list of frequencies comprises an overlapping carrier or a non-overlapping carrier;
transmitting, by the base station, the at least one message to a user equipment (UE); and
receiving, by the base station, a report based on new radio (NR) early measurement operations performed by the UE, the NR early measurement operations performed based on a determination of whether the at least one frequency is the overlapping carrier or a non-overlapping carrier.

26. The method of claim 25, wherein:
the overlapping carrier comprises a carrier configured by higher layer for both early measurement reporting and inter-frequency mobility measurements; and
the non-overlapping carrier comprises a carrier configured by higher layer for early measurement reporting while not configured for inter-frequency mobility measurements.

27. The method of claim 25, wherein the at least one message comprising a first message, a second message, a third message, or a combination thereof.

28. The method of claim 27, wherein:
each of the first message and the second message include a system information block (SIB) message,
the first message includes a new radio (NR) SIB or a legacy-based SIB, or
a combination thereof.

29. The method of claim 27, wherein:
the first message includes an NR SIB2/4 message, a SIB5 message, or a SIB24 message,
the second message includes a NR SIB,
the third message includes a radio resource controller (RRC) release message or a new radio (NR) release message, or
a combination thereof.

30. The method of claim 25, wherein the at least one message includes common control signaling and a validity timer.

31. An apparatus configured for wireless communication, comprising:
at least one processor; and
a memory coupled to the at least one processor,
wherein the at least one processor is configured to:
generate, by a base station, at least one message including a list of SSB frequencies, wherein at least one frequency included in the list of frequencies comprises an overlapping carrier or a non-overlapping carrier;

transmit, by the base station, the at least one message to a user equipment (UE); and receive, by the base station, a report based on new radio (NR) early measurement operations performed by the UE, the NR early measurement operations performed based on a determination of whether the at least one frequency is the overlapping carrier or a non-overlapping carrier.

32. The apparatus of claim 31, wherein the at least one message comprising a first message, a second message, a third message or a combination thereof.

33. The apparatus of claim 32, wherein:
each of the first message and the second message include a system information block (SIB) message,
the first message includes a new radio (NR) SIB or a legacy-based SIB, or
a combination thereof.

34. The apparatus of claim 32, wherein:
the first message includes an NR SIB2/4 message, a SIB5 message, or a SIB24 message,
the first message includes a new radio (NR) SIB or a legacy-based SIB,
the third message includes a radio resource controller (RRC) release message or a new radio (NR) release message, or
a combination thereof.

35. The apparatus of claim 31, wherein the at least one message includes common control signaling and a validity timer.

\* \* \* \* \*